United States Patent [19]

Bickel et al.

[11] 3,719,673
[45] March 6, 1973

[54] DERIVATIVES OF 7-AMINOCEPHALOSPORANIC ACID

[75] Inventors: Hans Bickel, Binnengen; Rolf Bosshardt, Johannes Mueller, both of Arlesheim, all of Switzerland

[73] Assignee: Ciba Geigy Corporation, Ardsley, N.Y.

[22] Filed: Nov. 17, 1970

[21] Appl. No.: 90,470

[30] Foreign Application Priority Data

| Nov. 28, 1969 | Switzerland | 17731/69 |
| Dec. 24, 1969 | Switzerland | 19243/69 |
| Feb. 17, 1970 | Switzerland | 2281/70 |
| April 20, 1970 | Switzerland | 5877/70 |
| June 2, 1970 | Switzerland | 8199/70 |

[52] U.S. Cl. ........................ 260/243 C, 424/246
[51] Int. Cl. ............................................ C07d 99/24
[58] Field of Search .............................. 260/243 C

[56] References Cited

UNITED STATES PATENTS

| 3,483,197 | 12/1969 | Bickel et al. | 260/243 C |
| 3,516,997 | 6/1970 | Takano et al. | 260/243 C |

*Primary Examiner*—Nicholas S. Rizzo
*Attorney*—Harry Goldsmith, Joseph G. Kolodny and Mario A. Monaco

[57] ABSTRACT

Compounds of the formula

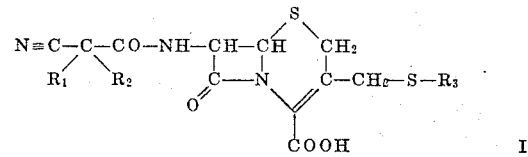

in which $R_1$ and $R_2$ each represent a hydrogen atom or an unsubstituted or substituted monovalent hydrocarbon radical or an unsubstituted or substituted monovalent heterocyclyl radical bound by way of a carbon atom, or together represent a divalent hydrocarbon radical that may be interrupted by one or more hetero atoms and/or substituted, and $R_3$ represents a heterocyclyl radical having aromatic character which is bound to the sulphur atom by way of a carbon atom and which contains at least two nitrogen atoms and a further hetero atom selected from the group consisting of nitrogen, oxygen and sulphur. They have antimicrotial activity.

13 Claims, No Drawings

DERIVATIVES OF 7-AMINOCEPHALOSPORANIC ACID

French Pat. specification No. 1,463,651 is concerned with therapeutically active derivatives of 7-aminocephalosporanic acid of the formula

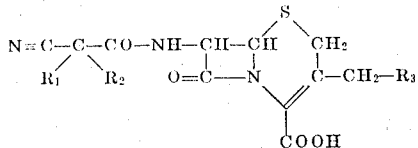

in which $R_1$ and $R_2$ have the meanings given below and in which $R_3$ represents, inter alia, a heterocyclic etherified mercapto group. The observation has been made that compounds having a specially powerful antibiotic action are those corresponding to the formula I

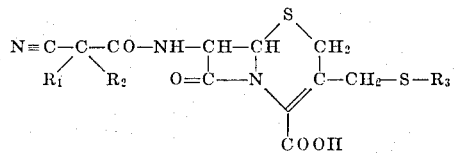

in which $R_3$ represents a heterocyclic radical having aromatic characteristics which is bound to the sulphur atom by way of a carbon atom and which contains at least two nitrogen atoms and a further hetero atom that can be a nitrogen, oxygen or sulphur atom. In the above formula I, $R_1$ and $R_2$ can be identical or different; each represents a hydrogen atom or an optionally substituted monovalent hydrocarbon radical or a heterocyclyl monovalent radical bound by way of a carbon atom, or together they can represent a divalent hydrocarbon radical that may be interrupted by hetero atoms and/or substituted.

Optionally substituted monovalent hydrocarbon radicals are primarily lower alkyl, monocyclic or bicyclic aryl or aryl-lower alkyl radicals, especially monocyclic radicals, for example, optionally substituted phenyl, toloyl or benzyl radicals; optionally substituted monovalent heterocyclyl radicals $R_1$ or $R_2$ are, for example, monocyclic or bicyclic heterocyclyl radicals or heterocyclyl lower alkyl radicals, preferably those having five to six ring atoms and up to three hetero atoms, especially monocyclic heterocyclyl radicals with aromatic characteristics having five to six ring atoms and a sulphur, oxygen or nitrogen atom, for example, thienyl, furyl, pyridyl, picolyl or pyrryl radicals or corresponding heterocyclyl lower alkyl radicals, for example, thenyl, furfuryl or pyridyl(2)-methyl radicals.

Substituents of these aliphatic hydrocarbon radicals or aromatic, araliphatic or heterocyclic rings are, for example, one or more identical or different functional groups, for example, hydroxyl groups, lower alkoxy groups or lower alkylmercapto groups, free or esterified carboxyl groups, amino groups, nitro groups, cyano or carbonyl groups and especially halogen atoms or trifluoromethyl groups and, in the case of the rings, also lower alkyl groups.

Optionally substituted divalent hydrocarbon radicals are, for example, saturated or unsaturated aliphatic, cycloaliphatic or araliphatic radicals, for example, oxygen-bound divalent radicals of corresponding aldehydes, ketones or acid amides, especially divalent saturated or unsaturated aliphatic or cycloaliphatic hydrocarbon radicals optionally interrupted by hetero atoms, for example, nitrogen, oxygen and/or sulphur atoms and/or substituted by functional groups, for example, by halogen atoms or nitro or amino groups, for example, alkylidene, alkenylidene, cycloalkylidene or cycloalkenylidene radicals, especially those having one to eight, especially one to six carbon atoms, for example, methylene, and methylene substituted by one or two lower alkyl or lower alkenyl radicals, for example, allylidene, ethylidene, isopropylidene, butylidene, cyclopentylidene, cyclohexylidene, or divalent saturated or unsaturated aliphatic hydrocarbon radicals substituted by aryl radicals, for example, phenylalkylidene or phenylalkenylidene radicals, whereby the aryl radicals can also be substituted, for example, by one or more lower alkyl. lower alkoxy, nitro or amino groups and/or halogen atoms, especially a benzylidene or phenylallylidene radical that may be substituted as mentioned above.

Preferably, $R_1$ and $R_2$ each represents a hydrogen atom or an alkylidene group having one to six carbon atoms, as mentioned above, or benzylidene that may be substituted, especially by halogen atoms or lower alkyl or lower alkoxy groups or nitro groups. In particular, $R_1$ can also represent a hydrogen atom and $R_2$ a lower alkyl, phenyl, phenyl-lower alkyl or a five-membered to six-membered heterocyclyl radical that can be substituted as mentioned above.

The heterocyclic radical $R_3$ contains five or six, preferably five, ring atoms, but it can be fused to a benzene ring. Both rings can be substituted by aliphatic or aromatic hydrocarbon radicals, especially lower alkyl radicals, for example, methyl, ethyl, propyl, isopropyl, n-butyl, isobutyl, tert.-butyl radicals, lower alkylthio radicals, cycloalkyl radicals, for example, cylopentyl, cyclohexyl radicals, or by aryl radicals, for example, phenyl or substituted phenyl radicals, for example, by phenyl substituted by one or more nitro groups or halogen atoms or lower alkyl or lower alkoxy groups, or by thienyl, especially thienyl(2). The following are given as examples of the heterocyclyl radical: 1H-1,2,3-triazol-5-yl, 1,3,4-triazol-2-lyl, 5-methyl-1,3,4-triazol-2-yl, 1H-1,2,4-triazol-5-yl, 1-phenyl-3-methyl-1H-1,2,4-triazol-5-yl, 4,5-dimethyl-4H-1,2,4-triazol-3-yl, 4-phenyl-4H-1,2,4-triazol-3-yl, 1H-tetrazol-5-yl, 1-methyl-1H-tetrazol-5-yl, 1-ethyl-1H-tetrazol-5-yl, 1-n-propyl-1H-tetrazol-5-yl, 1-isopropyl-1H-tetrazol-5-yl, 1 -n-butyl-1H-tetrazol-5-yl, 1-cyclopentyl-1H-tetrazol-5-yl, 1-phenyl-1H-tetrazol-5-yl, 1-para-chlorophenyl-1H-tetrazol-5-yl, 1,2,3-thiadiazol-5-yl, 1,3,4-thiadiazol-2-yl, 1,2,4-thiadiazol-3-yl, 1,2,4-thiadiazol-5-yl, 3-methyl-1,2,4-thiazol-5-yl, 2-methyl-1,3,4-thiadiazol-5-yl, 2-methylthio-1,3,4-thiadiazol-5-yl, 2-ethyl-1,3,4-thiadiazol-5-yl, 2-n-propyl-1,3,4-thiadiazol-5-yl, 2-isopropyl-1,3,4-thiadiazol-5-yl, 2-phenyl-1,3,4-thiadiazol-5-yl, 1,2,4-oxadiazol-5-yl, 1,2,3-oxadiazol-5-yl, 1,3,4-oxadiazol-5-yl, 2-methyl-1,3,4-oxadiazol-5-yl, 2-ethyl-1,3,4-oxadiazol-5-yl, 2-phenyl-1,3,4-oxadiazol-5-yl, 2-para-nitrophenyl-1,3,4-oxadiazol-5-yl, 2[thienyl(2)]-1,3,4-oxadiazol-5-yl, thiatriazol-5-yl, and also the corresponding radicals having six ring atoms.

The salts of the new compounds are metal salts, primarily the salts of therapeutically useful alkali or alkaline earth metals, for example, sodium, potassium, ammonium, calcium, or salts with organic bases, for example, triethylamine, N-ethylpiperidine, dibenzylethylenediamine, procaine, diisopropylamine, ethanolamine. If the group $R_3$ is basic, inner salts can form.

The new compounds have a specially good antibacterial action. They are effective against both Gram positive and especially Gram negative bacteria, for example, *Staphylococcus aureus* (penicillin resistant), *Escherichia coli*, *Klebsiella pneumoniae*, *Salmonella typhosa* and *Bacterium proteus*, as has been shown by tests on animals, for example, mice. They can therefore be used for combating infections caused by such microorganisms, and also as additives to feedstuffs, for preserving foodstuffs and also as disinfectants. Compounds that are specially valuable are those in which the acyl radical in 7-position is a cyanoacetyl, methylcyanoacetyl, phenylcyanoacetyl, para-chlorophenylcyanoacetyl or thienyl(2)-cyanoacetyl radical and $R_3$ is a tetrazol-5-yl or 1,3,4-thiadiazol-5-yl radical optionally substituted in 2-position.

The compounds containing an alkylidene group can also be used as intermediate products for the purification of compounds having an unsubstituted cyanoacetyl radical, because, in an aqueous medium, and especially at an elevated temperature, and at an alkaline pH, the alkylidene group can be split off hydrolytically.

The new compounds are obtained by reacting a compound of the formula

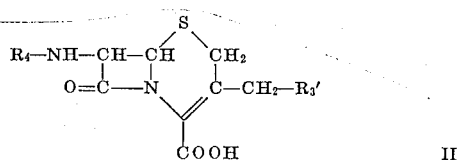

in which $R_4$ represents an acyl radical of the formula Ia

in which $R_1$ and $R_2$ have the meanings ascribed to them in the formula I, and in which $R'_3$ represents a functionally modified group, especially an esterified hydroxyl group, for example, a hydroxyl group esterified by a mineral acid, for example, a hydrohalic acid, for example, hydriodic acid or hydrofluoric acid or especially hydrobromic acid or hydrochloric acid, or by a carboxylic acid, for example, a lower alkane acid optionally substituted, for example, by a halogen, for example, propionic acid, chloroacetic acid, especially acetic acid, or an aryl or aryl-lower alkyl carboxylic acid, for example, benzoic acid, phenylacetic acid, or an ester or a salt of such a compound with a thiol of the formula Ib

in which $R_3$ has the meaning ascribed to it in the formula I, or a metal salt thereof, or by reacting a compound of the formula II, in which $R_4$ represents a hydrogen atom and $R'_3$ stands for $S—R_3$, or an ester or a salt of such a compound with an acylating agent containing the acyl radical of the formula Ia, and, if desired, reacting a compound of the formula I so obtained, in which $R_2$ and $R_2$ each represents a hydrogen atom, with an aldehyde, a ketone or a nitrile, advantageously in the presence of a catalyst and, if desired, splitting an ester group that may be present and, if desired, converting the compounds obtained into their metal salts, for example, alkali or alkaline earth metal salts, or salts with ammonia or organic bases, or forming the free carboxylic acids or, optionally, internal salts from salts obtained.

The compounds used as starting materials are known or can be made according to known methods. Compounds of the formula II, in which $R'_3$ represents an esterified hydroxyl group and $R_4$ represents the acyl radical of the formula Ia, and the manufacture thereof are described in French Pat. specification Nos. 1,463,651 and 1,588,507. Salts thereof are, for example, salts with alkali or alkaline earth metals or with zinc or with organic bases, for example, triethylamine, diisopropylamine, ethanolamine. Compounds of the formula II, in which $R_4$ represents a hydrogen atom and $R'_3$ represents $S—R_3$, are obtained, for example, by reacting 7-aminocephalosporanic acid or a salt thereof with a thiol or salt in the same manner as indicated for the 7–ACA acylated by the radical Ia; they can also be prepared by reacting a 7-acylaminocephalosporanic acid, in which "acyl" represents the acyl radical of any carboxylic acid, for example, an acetyl, propionyl, pentanoyl, hexanoyl or phenylacetyl radical or the aminoadipoyl radical (in which case the starting material is Cephalosporin C), in the same manner as for 7–ACA acylated by the radical Ia with a thiol or a salt thereof and then splitting off the N-acyl radical, for example, as described in French Pat. specification No. 1,394,820.

Metal salts of the thiols that are specially suitable are the alkali metal salts, for example, the sodium or potassium salts. The salts can be prepared, for example, by reacting the thiol with a carbonate, bicarbonate or hydroxide of the alkali metal.

Esters of compounds of the formula II are those in which the carboxyl group in 4-position of the dihydrothiazine ring is esterified. Since the ester group, if desired or required, is to be split off preference is given to those that can be easily split to the free carboxylic acid, for example, solvolytically, hydrogenolytically, reductively, by nucleophilic exchange or photolytically.

Certain esterified carboxyl groups, especially carbo-lower alkoxy groups in which the lower alkyl group contains a halogen atom, especially a chlorine atom, in β-position, and especially the carbo-2,2,2-trichloroethoxy or carbo-2-iodoethoxy group, can be converted into the free carboxyl group by reduction, for example, by treatment with nascent hydrogen. They can be converted into the free carboxyl group in a manner known per se, preferably by a treatment with nascent hydrogen under acid or neutral conditions, for example, with zinc in the presence of a suitable lower alkane carboxylic acid, for example, acetic acid, especially slightly dilute acetic acid, for example, 90 percent acid, or with a strongly reducing metal salt, for example, cobalt(II) acetate in the presence of aqueous media.

A carbo-lower alkoxy group in which the lower alkyl in α-position is poly-branched and/or contains in α-position radicals having aromatic characteristics, for example, optionally substituted aromatic hydrocarbon groups, for example, phenyl radicals, or heterocyclic groups having aromatic characteristics, for example, the 2-furyl group, for example, the carbo-tertiary-butyloxy group, the carbo-tertiary-pentyloxy group or the carbo-2-furfuryloxy group and a carbo-cycloalkoxy group, in which cycloalkyl represents a polycyclic radical, for example, the carbo-adamantyloxy group, can be converted into the free carboxyl group by treatment with a suitable acidic agent, for example, a strong organic carboxylic acid, preferably a halogenated lower alkane carboxylic acid, primarily trifluoroacetic acid.

Esterified carboxyl groups that can also easily be converted into the free carboxyl group under mild conditions are silylated and stannylated carboxyl groups. These are groups that are formed by treating compounds having a free carboxyl group, and also salts, for example, alkali metal salts, for example, the sodium salts of such compounds, with a suitable silylating agent, for example, a tri-lower alkyl-silyl halide, for example, trimethylsilyl chloride, or an N-(tri-lower alkyl-silyl)-N-$R_a$-N-$R_b$-amine, in which $R_a$ represents a hydrogen atom or a lower alkyl group and $R_b$ represents a hydrogen atom, a lower alkyl group or a tri-lower alkyl-silyl group (cf. for example, British Pat. specification No. 1,073,530), or with a suitable stannylating agent, for example, a bis-(tri-lower alkyl-tin)-oxide, for example bis-(tri-n-butyl tin) oxide, a tri-lower alkyl-tin hydroxide, for example, triethyl tin hydroxide, a tri-lower alkyl-lower alkoxy-tin compound or a tetra-lower alkyl-tin compound, or a tri-loweralkyl-tin halide, for example, tri-n-butyl-tin chloride (cf. Netherlands published Pat. application No. 67/17107). The above-mentioned starting materials having silylated or stannylated carboxyl groups can be converted into the desired compounds having a free carboxyl group, for example, by treatment with a hydrogen-donating agent that is preferably neutral, especially water or an alcohol, for example, a lower alkanol, for example, ethanol.

The reaction with the thiol is carried out as described in Belgian Pat. specification No. 617,687 or in Netherlands Pat. specification No. 6,805,179 in an inert solvent, for example, an alcohol, an ether, a ketone, an N,N-disubstituted amide, for example, dimethylformamide, dimethylacetamide, and, when salts are used, preferably in water or in an inert solvent that is miscible with water or in a mixture of water and such a solvent, for example, in acetone, methanol, ethanol, dioxane, tetrahydrofuran or aqueous solutions thereof, preferably in aqueous acetone. The reaction temperature is +15° to 70°C, preferably 40° to 60°C. The pH of the solution is preferably kept at between 5.0 and 7.5. If necessary, a buffer is added, for example, a phosphate buffer or sodium acetate, or, if the compound is used in the form of an alkali metal salt, acetic acid, for example, is added.

The acylation with the acyl radical Ia can be carried out in the manner described in French Pat. specification No. 1,463,651, for example with an acid halide, such as for example an acid chloride or acid bromide, or a pure or mixed anhydride, for example one with monoesterified carbonic acid, for example its aryl-lower alkyl monoesters or lower-alkyl monoesters, for example, benzyloxy carbonic acid, ethoxy carbonic acid or preferably with acetic acid having one or more electrophilic groups, for instance trichloracetic acid, or with polybranched lower alkane acids, for example pivalic acid, or with alkane sulphonic or arene sulphonic acids, for example methane sulphonic acid or toluene sulphonic acid, or with the free acid itself in the presence of a condensing agent, for example N,N-carbonylditriazol, an isoxazolium reagent, a carbodiimide, for example dicyclohexylcarbodiimide, or according to the method of the activated esters, for example, esters derived from p-nitrophenol, pentachlorophenol or thiophenol, or according to the azide method or other methods as are known from the peptide synthesis.

As examples of aldehydes, ketones or nitriles there may be mentioned those having aliphatic characteristics, for example, formaldehyde, acetaldehyde, acetone, methylethylketone, ethylbutylketone, cyclopentanone, cyclohexanone, cycloheptanone, acetonitrile, trichloroacetonitrile or trifluoroacetonitrile, or those having araliphatic or aromatic characteristics with not more than two rings and that, as mentioned above, are optionally substituted, for example, benzaldehyde, para-chlorobenzaldehyde, para-nitrobenzaldehyde, cinnamic aldehyde, salicylaldehyde, anisaldehyde, vanillin, acetophenone, benzophenone, para-oxyacetophenone, penylacetonitrile, benzonitrile or cinnamic acid nitrile.

Salts are primarily used as catalysts for the reaction with the carbonyl compounds or nitriles, especially acetates of ammonia or amines, for example, ammonium acetate, amylamineacetate, piperidine acetate, triethylammonium acetate, Dowex 3 (free base and acetic acid salt), and also compounds that contain both acidic and basic groups, for example, para-aminophenol. Substances that can also be used as catalysts are the salts of compounds of the formula II, in which $COR_4$ represents the carboxyl group, with the said bases.

It is preferable to use those starting materials that yield the end-products that have been stated to be specially effective.

The invention further includes any variant of the present process in which an intermediate product obtainable at any stage of the process is used as starting material and any remaining steps are carried out, or the process is discontinued at any stage thereof, or in which a starting material is formed under the reaction conditions, or in which the reaction components may be present in the form of their salts.

The new compounds can be used as medicaments, for example, in the form of pharmaceutical preparations. Such preparations contain the compounds in admixture with organic or inorganic, solid or liquid pharmaceutical excipients suitable for enteral, topical or parenteral administration. The excipient used must not react with the new compounds, suitable substances being, for example, water, gelatine, lactose, starch, stearyl alcohol, magnesium stearate, talcum, vegetable oils, benzyl alcohols, gums, propylene glycol, polyalkylene glycols, white petroleum jelly, cholesterol or other known pharmaceutical excipients. The pharmaceutical preparations can be in the form of tablets, coated tablets, ointments, creams, capsules, or in the form of solutions, suspensions or emulsions. If necessary, they can be sterilized and/or contain adjuvants, for example, preservatives, stabilizing agents, wetting agents or emulsifying agents or solubilizers, salts for regulating the osmotic pressure or buffers. They can also contain other therapeutically useful substances. The preparations are obtained by the customary methods.

The following examples illustrate the invention.

The following systems are used for the thin-layer chromatogram on silica gel: system 52A = n-butanol/glacial acetic acid/water (67:10:23) system 101A = n-butanol/pyridine/glacial acetic acid/water (42:24:4:30), system 102A = ethylacetate/methylethyl ketone/formic acid/water (50:30:10:10). The spots are made visible with an iodine spray.

In the examples, "MIC" means the minimum inhibitory concentration which is measured either by the gradient plate test described in "Antibiotics" Vol. I by Gottlieb and Shaw, New York, 1967, page 508, a modified method of that described by V. Bryson and R. Szybalski, Science 116, 45 (1952), or, when indicated, by the serial dilution method commonly employed in testing antimicrobial compounds. The MIC is determined on strains of *Staphylococcus aureus* SG 511 (sensitive to penicillin) or *Staphylococcus aureus* 2999 (resistant to penicillin), *Bacillus subtilis*, *Bacillus megatherium*, *Bacillus cereus*, *Escherichia coli* 2018, *Klebsiella pneumoniae* and/or *Salmonella typhimuri*.

Example 1 a. 1.52 Grams of 2-methyl-1,3,4-thiadiazoline-5-thione (cf. Acta Chmica Scand. 20, 69 (1966) ) are suspended in a solution of 3.2 grams of the sodium salt of 7-cyanoacetylaminocephalosporanic acid in 72 ml of phosphate buffer (1/15 molar) having a pH of 6.4. The pH is then adjusted to 6.4 by the dropwise addition of 2N sodium carbonate solution while stirring vigorously and the batch is heated for 6 hours at 60°C in a nitrogen atmosphere. The reaction mixture acquires thereby a pH of 6.9. The batch is cooled and extracted twice with 800 ml of ethyl acetate each time. The organic phases are washed twice with 10 ml of buffer (pH 6.5) each time and discarded. The combined aqueous phases are covered with 1 liter of ethyl acetate and the pH is adjusted to 2.2 with about 8.5 ml of 4N hydrochloric acid while stirring vigorously. The brown precipitate that forms thereby is removed by filtration. The phases are separated, the aqueous solution is saturated with sodium chloride and extracted with 1 liter of ethyl acetate and then with 0.6 liter of ethyl acetate. The organic phases are shaken twice with 40 ml of saturated sodium chloride solution each time, then dried with sodium sulphate, fultered through a column of 90 grams of silica gel (diameter: 4.5 cm, height: 12.5 cm) and then evaporated to dryness in vacuo. The residue is dissolved in a mixture of acetone and methanol and then converted into the sodium salt with sodium-α-ethylhexanoate. By restoration to the acid form in the manner described for the extraction and subsequent filtration of the residue, dissolved in a mixture of equal parts of chloroform and acetone, through a column of silica gel (diameter:height = 1:9) there is obtained 7-cyanoacetylamino-3-(2-methyl-1,3,4-thiadiazol-5-ylthio)methyl-ceph-3-em-4-carboxylic acid. The UV spectrum in water shows the compound to have a maximum at λ268 nm.

Thin-layer chromatogram on silica gel: $Rf_{52}A = 0.36$, $Rf_{101A} = 0.54$, $Rf_{102A} = 0.68$. For comparison: for 7-bromoacetylcephalosporanic acid is $Rf_{52A} = 0.42$, $Rf_{102A} = 0.77$; for "Ceporin" $Rf_{101A} = 0.28$, $Rf_{102A} = 0.23$, $Rf_{52A} = 0.13$.

b. 6.0 grams of 2-methyl-1,3,4-thiadiazoline-5-thione are suspended in a solution of 12.8 grams of the sodium salt of 7-cyanoacetylaminocephalosporanic acid in 280 ml of phosphate buffer having a pH of 6.4. The pH is then adjusted 6.6 by the dropwise addition of 2N sodium carbonate solution while stirring vigorously and the batch is heated for 8 hours at 60°C in a nitrogen atmosphere. The batch is cooled and extracted successively with 2 liters of ethyl acetate and 1.5 liters of ethyl acetate. The organic phases are washed twice with 20 ml of buffer (pH 6.5) each time and discarded. The combined aqueous phases are covered with 2.5 liters of ethyl acetate and the pH is adjusted to 2.4 with about 35 ml of 4N hydrochloric acid while stirring vigorously. The brown precipitate that forms thereby is removed by filtration. The phases are separated, the aqueous solution is saturated with sodium chloride and extracted successively with 1.5 liters of ethyl acetate and 1 liter of ethyl acetate. The organic phases are shaken twice with 100 ml of saturated sodium chloride solution each time, dried over sodium sulphate, filtered through a column of 150 grams of silica gel (diameter: 4.5 cm, height: 21 cm) and then evaporated to dryness in vacuo. The residue (13.9 grams) is dissolved in about 50 ml of acetone, anhydrous ethyl acetate is added and the batch is concentrated to a small volume in vacuo. The residue is again dissolved in ethyl acetate, concentrated, and a few drops of hexane are added. The batch is allowed to stand for 1 hour at −15°C, the precipitated is isolated by vacuum filtration, washed first with a 3:1 mixture of ethyl acetate and hexane and then with hexane. 3.7 grams of the precipitate so obtained are adsorbed on to 35 grams of neutral silica gel from a solution in acetone. The dry adsorbate is added to a column of 300 grams of silica gel (diameter: 4.5 cm, height: 45 cm) and eluted first with a mixture of 2 parts by volume of chloroform and 1 part by volume of acetone and later with a 1:1 mixture of chloroform and acetone. The first 1.2 liters of eluate are discarded and the following 1.2 liters contain the reaction product. The last 1.2 liters are evaporated to dryness in vacuo, the residue is dissolved in 40 parts by volume of acetone, 10 parts by volume of methanol are added, and the residue is then converted into the crystalline sodium salt of 7-cyanoacetylamino-3-(2-methyl-1,3,4-thiadiazol-5-ylthio)methylceph-3-em-4-carboxylic acid by the addition of 1.3 parts by volume of a 3-molar methanolic solution of sodium-α-ethylhexanoate. The sodium salt has no clearly defined melting point, but decomposes at about 215°C with brown discoloration. The free acid melts at 146–147°C (in vacuum tube, with decomposition). UV spectrum: $\lambda_{max} = 272$ nm ($\epsilon = 13\,500$); $[\alpha]_D^{20} = -35° \pm 1°$ ($c = 1.02$ in water). Thin-layer chromatogram on silica gel: $Rf_{52A} = 0.36$; $Rf_{101A} = 0.54$; $Rf_{102A} = 0.68$; Rf in 9:1 mixture of ethyl acetate and glacial acetic acid = 0.14.

In the gradient plate test is MIC: *St.aureus* SG 511 = 0.1γ/ml; *St.aureus* 2999 = 2.5γ/ml; *Bac.subt.* =

0.15γ/ml; Bac. meg. = 20γ/ml; Bac.cereus = 20γ/ml; E.coli = 1.0γ/ml; Kl. pneum. = 0.6γ/ml; Salm.typh. = 1γ/ml.

Example 2

A solution of 0.94 gram of anhydrous cyanoacetic acid in 10 ml of tetrahydrofuran is cooled to −50°C while stirring thoroughly and then 1.5 ml of triethylamine and 1.2 ml of trichloroacetyl chloride are added in a nitrogen atmosphere. The batch is allowed to react for a further 15 minutes at −50°C while stirring. A previously cooled solution of 1.5 grams of 7-amino-3-(2-methyl-1,3,4-thiadiazol-5-ylthio)methyl-ceph-3-em-4-carboxylic acid and 2.5 ml of triethylamine in 25 ml of absolute methylene chloride is added while maintaining that temperature, and the batch is stirred for a further 15 minutes at −50°C and 30 minutes at −20°C in a nitrogen atmosphere. The reaction solution is then shaken with 20 ml of a 10 percent aqueous potassium dihydrogen phosphate. The phases are separated and the aqueous phase is extracted with 50 ml of ethyl acetate. The organic phases are washed twice with 50 ml of 1-molar phosphate buffer (pH 5) each time. The combined aqueous solutions are covered with 150 ml of ethyl acetate, the pH is adjusted to 2.5 with dilute hydrochloric acid, the batch is shaken and the phases separated. The bottom phase is saturated with sodium chloride and then extracted successively with 100 ml of ethyl acetate and 50 ml of ethyl acetate. The organic phases are washed successively twice with 5 ml of saturated sodium chloride solution each time, dried with sodium sulphate, filtered through a column of 8 grams of silica gel (diameter: 20 mm), and evaporated. The residue is triturated with a small amount of anhydrous ethyl acetate, the undissolved product is isolated by vacuum filtration and converted into the crystalline sodium salt of 7-cyanoacetylamino-3-(2-methyl-1,3,4-thiadiazol-5-ylthio)methylceph-3-em-4-carboxylic acid by means of sodium-α-ethylhexanoate. This is identical with the substance described in Example 1b).

The 7-amino-3-(2-methyl-1,3,4-thiadiazol-5-ylthio)methylceph-3-em-4-carboxylic acid used as starting material can be prepared as follows:

1. 7-(D-5-aminoadipoylamino)-3-(2-methyl-1,3,4-thiadiazol-5-ylthio)methylceph-3-em-4-carboxylic acid 2.4 grams of 2-methyl-1,3,4-thiadiazoline-5-thione are suspended in a solution of 6.42 grams of the sodium salt of 7-(D-5-aminoadipoylamino)-cephalosporanic acid in 112 ml of phosphate buffer having a pH of 6.4. The pH is adjusted to 6.6 by the dropwise addition of a 2N sodium carbonate solution while stirring vigorously and the batch is heated for 6 hours at 60°C. The batch is cooled, filtered through a glass frit G4, 1.25 liters of acetone are added to the filtrate while stirring well and the batch is allowed to stand for several hours at −15°C. The precipitate that forms is isolated by vacuum filtration and washed with acetone. The sodium salt of 7-(D-5-aminodipoylamino)-3-(2-methyl-1,3,4-thiadiazol-5-ylthio)methylceph-3-em-4-carboxylic acid so obtained begins to display a brown coloration as from 185°C when heated in a vacuum tube, sinters at about 250°C and decomposes at about 270°C. Thin-layer chromatogram on silica gel: $Rf_{101A}$ = 0.22 (Ceporin: 0.28).

2. 7-Amino-3-(2-methyl-1,3,4-thiadiazol-5-ylthio)methylceph-3-em-4-carboxylic acid 6.21 grams of the substance obtained as described under 1. and that has been dried thoroughly are suspended in 366 ml of absolute methylene chloride, and then 4.86 ml of absolute pyridine and 11.2 ml of trimethylchlorosilane are added. The suspension is stirred vigorously for 2 hours at 30°C in a nitrogen atmosphere. 12.2 milliliters of pyridine are added, the reaction solution is cooled to −20°C and then 100 ml of an 8 percent solution of phosphorus pentachloride in methylene chloride (internal temperature not higher than −10°C) are added in portions. The milky solution is stirred for a further 40 minutes at about −12°C. The batch is again cooled to −20°C and 146 ml of absolute methanol are run in in portions, the internal temperature rising to −10°C. The batch is allowed to react for a further 30 minutes at that temperature and then for a further 30 minutes at +25°C.

For the purpose of hydrolysis, 18.25 ml of 50 percent aqueous formic acid are added and the pH is adjusted to 2.0 by the addition of about 11 ml of triethylamine. The batch is stirred for 45 minutes at room temperature, during which a fine precipitate forms. The pH is then adjusted to 4.0 by a further addition of triethylamine, and the reaction mixture is allowed to stand in an ice bath for about 2 hours. The precipitate is isolated by vacuum filtration and washed successively with a small amount of water, methanol and ether. The 7-amino-3-(2-methyl-1,3,4-thiadiazol-5-ylthio)methylceph-3-em-4-carboxylic acid is obtained. It has not a clearly defined melting point, but turns brown as from 180°C and decomposes at about 220°C. Thin-layer chromatogram: $Rf_{101A}$ = 0.35, (Ceporin: 0.28); $Rf_{52A}$ = 0.18 (Ceporin: 0.09).

Example 3 a. Twenty-four grams of the crystallized zinc salt of 7-(D-5-aminoadipoylaminol-aphalosporanic acid are suspended in 240 ml of water in a centrifuge glass. A 30 percent aqueous solution of sodium sulphide is then added in small portions while stirring vigorously and checking the pH. In the course of 25–30 minutes the pH of the solution rises rapidly from 4.7 to about 8.5 and then slowly to about 9. As soon as the pH begins to rise rapidly at about 9.4, the addition is stopped (about 34 ml of sodium sulphide solution are consumed). Towards the end of the operation, the reaction solution is cooled in an ice bath. The pH is then adjusted to 6.7 by the dropwise addition of 1-molar aqueous phosphoric acid while stirring and cooling. The batch is centrifuged for 15 minutes at 2,000 r.p.m. and 235 ml of yellow decanted liquid are obtained. The white sediment is stirred in 100 ml of phosphate buffer (pH 6.4) and again centrifuged (115 ml of a pale yellow decanted liquid are obtained). 10.4 grams of 2-methyl-1,3,4-thiadiazoline-5-thione are introduced into the combined decanted liquids while stirring well, and the pH is adjusted to 6.6 by the dropwise addition of about 23 ml of a 2N sodium carbonate solution. The batch is then heated for 6 hours at 60°C in a nitrogen atmosphere. The cooled reaction mixture is filtered through a glass frit G4, 4.4 liters of acetone are added while stirring vigorously and the batch is allowed to stand for several hours at −15°C. The precipitate, the sodium salt of 7-(D-5-aminoadipoylamino)-3-(2- methyl-1,3,4-thidiazol-5-ylthio)-methylceph-3-em-4-carboxylic acid, is isolated in the manner described in Example 2 under 1.

b. Six grams of the crystallized zinc salt of 7-(D-5-aminodipoylamino)-cephalosporanic acid are suspended in 60 ml of water in a centrifuge glass. A 15 percent solution of tripotassium phosphate is then added in small portions while stirring vigorously and checking the pH until a pH of 9.45 is reached (rise of pH as under a)). The pH is then adjusted to 6.7 with 1-molar phosphoric acid and centrifugation is carried out as under a). 2.6 grams of 2-methyl-1,3,4-thiadiazoline-5-thione are introduced into the combined decanted liquids (74 + 30 ml) and the pH is adjusted to 6.6 by the addition of about 11 ml of 2N sodium carbonate solution. The batch is heated for 6 hours at 60°C in a nitrogen atmosphere, filtered through a G4 frit, 1.4 liters of acetone are added and the precipitate obtained is the potassium salt of 7-(D-5-aminodipoylamino)-3-(2-methyl-1,3,4-thizol-5-ylthio)-methylceph-3-em-4-carboxylic acid. A thin-layer chromatogram on silica gel (system 101A) shows it to have the same Rf value as the sodium salt.

Example 4

5.27 Grams of 1-methyl-5-mercaptotetrazole are suspended in a solution of 12.8 grams of the sodium salt of 7-cyanoacetylaminocephalosporanic acid in 280 ml of phosphate buffer (10%) (pH 6.7). The pH is adjusted to 6.6 by the dropwise addition of 2N sodium carbonate solution while stirring vigorously, and the batch is heated for 7 hours at 60°C in a nitrogen atmosphere. The mixture is cooled and extracted successively 2 liters of ethyl acetate and 1.5 liters of ethyl acetate. The organic phases are washed twice with 20 ml of buffer (pH 6.5) each time and discarded. The combined aqueous phases are covered with 2.5 liters of ethyl acetate and a pH of 2.5 is established with about 30 ml of 4N hydrochloric acid while stirring vigorously. The brown precipitate that forms thereby is removed by filtration. The phases are separated, the aqueous solution is saturated with sodium chloride, extracted once with 1.5 liters of ethyl acetate and then twice with 1 liter of ethyl acetate each time. The organic phases are shaken twice with 100 ml of saturated sodium chloride solution each time, dried with sodium sulphate and then concentrated in vacuo to a volume of about 150 ml. One hundred and fifty milliliters of hexane are added to this solution in small portions while stirring well and the batch is allowed to stand for several hours cold. It is then vacuum filtered and the residue is washed with a 1:1 mixture of ethyl acetate and hexane. The filtrate is discarded. The residue (6.57 grams) is absorbed on to 50 grams of neutral silica gel from a solution in acetone. The dry adsorbate is introduced into a column of 450 grams of neutral silica gel (diameter 5.75 cm, height 41 cm) and eluted with a mixture of 2 parts by volume of chloroform and 1 part by volume of acetone. The first 1.5 liters of eluate are discarded; the following 2 liters contain the reaction product. These two liters are evaporated to dryness in vacuo, the residue is dissolved in 40 parts by volume of acetone, 10 parts by volume of methanol are added and then the product is converted into the crystalline sodium salt of 7-cyanoacetylamino-3-(1-methyl-tetrazolyl-5-ylthio)methylceph-3-em-4-carboxylic acid by the addition of 1.3 parts by volume of a 3-molar methanolic solution of sodium-α-hexanoate. UV spectrum: $\lambda_{max}$ = 268 nm ($\epsilon$ = 11 150); $[\alpha]_D^{20}$ = +22° ± 1° ($c$ = 0.99; in water). Thin-layer chromatogram on silica gel: $Rf_{52A}$ = 0.28; $Rf_{101A}$ = 0.54; $Rf_{102A}$ = 0.76; Rf in ethyl acetate/glacial acetic acid (9:1) = 0.19.

Example 5

6.0 grams of 3-methyl-1,2,4-thiadiazoline-5-thione are suspended in a solution of 12.8 grams of the sodium salt of 7-cyanoacetylaminocephalosporanic acid in 280 ml of phosphate buffer (10%) (pH 6.7). The pH is then adjusted to 6.6 by the dropwise addition of 2N sodium carbonate solution while stirring vigorously and the batch is heated for 6 hours at 60°C in a nitrogen atmosphere. The mixture is cooled and extracted successively with 2 liters of ethyl acetate and 1.5 liters of ethyl acetate. The organic phases are washed twice with 20 ml of buffer (pH 6.5) each time and discarded. The combined aqueous phases are covered with 2.5 liters of ethyl acetate and the pH is adjusted to 2.5 with 4N hydrochloric acid while stirring vigorously. The brown precipitate that forms thereby is removed by filtration. The phases are separated, the aqueous solution is saturated with sodium chloride and extracted once with 1.5 liters of ethyl acetate and then twice with 1 liter of ethyl acetate each time. The organic phases are shaken twice with 100 ml of saturated sodium chloride solution each time, dried with sodium sulphate and concentrated to a volume of about 60 ml in vacuo, a voluminous precipitate being formed. One hundred milliliters of hexane are added to this slurry in small portions while stirring well and the batch is allowed to stand for 1 hour cold. It is then vacuum filtered and the residue is washed with a 2:3 mixture of ethyl acetate and hexane. The filtrate is discarded. The residue is absorbed on to 50 grams of neutral silica gel from a solution in acetone. The dry adsorbate is introduced into a column of 450 grams of neutral silica gel (diameter: 5.75 cm, height: 41 cm) and eluted first with a mixture of 2 parts by volume of chloroform and 1 part by volume of acetone. The first 1.2 liters of eluate are discarded; the subsequent 2.5 liters contain the reaction product. These 2.5 liters are evaporated to dryness in vacuo, the residue is dissolved in 40 parts by volume of acetone; 10 parts by volume of methanol are added and then vacuum residue and the product is converted into the crystalline sodium salt of 7-cyanoacetylamino-3-(3-methyl-1,2,4-thiadiazol-5-ylthio)methylceph-3-em-4-carboxylic acid by the addition of 1.3 parts by volume of a 3-molar methanolic solution of sodium-α-ethylhexanoate. UV spectrum: $\lambda_{max}$ = 274 nm ($\epsilon$ = 14 750); $[\alpha]_D^{20}$ = −3° ± 1° (c = 0.99 in water). Thin-layer chromatogram on silica gel: $Rf_{52A}$ = 0.47; $Rf_{101A}$ = 0.62; $Rf_{102A}$ = 0.84; Rf in ethyl acetate/glacial acetic acid (:1) = 0.37. MIC: St.aureus SG 511 = 0.07γ/ml; Bac.subt. = 0.2γ/ml; Bac.meg. = 20γ/ml; Bac.cereus = 15γ/ml; E.coli=2 γ/ml.

Example 6

16.0 grams of 2-methylthio-1,3,4-thiadiazoline-5-thione are suspended in a solution of 25.6 grams of the sodium salt of 7-cyanoacetylaminocephalosporanic acid in 560 ml of phosphate buffer (10%) (pH 6.7).

The pH is then adjusted to 6.6 by the dropwise addition of a 2N sodium carbonate solution while stirring vigorously, and the batch is heated for 6 hours at 60°C in a nitrogen atmosphere. The batch is cooled and extracted successively with 2.5 liters of ethyl acetate and 2 liters of ethyl acetate. The organic phases are washed twice with 50 ml of buffer (6.5) each time and discarded. The combined aqueous phases are covered with 2.5 liters of ethyl acetate and the pH is adjusted to 2.5 with 4N hydrochloric acid while stirring vigorously. The brown precipitate that forms is removed by filtration. The phases are separated, the aqueous solution is saturated with sodium chloride, extracted once with 1.5 liters of ethyl acetate and then three times with 1 liter of ethyl acetate each time. The organic phases are shaken twice with 100 ml of saturated sodium chloride solution each time, dried with sodium sulphate and concentrated in vacuo to a volume of about 400 ml, a precipitate being formed thereby. 350 milliliters of hexane are added to this mixture while stirring well and the batch is allowed to stand for 1 hour cold. The voluminous precipitate is isolated by vacuum filtration and the residue is washed with a mixture of ethyl acetate and hexane (1:1). The filtrate is discarded. The residue is adsorbed on to 50 grams of neutral silica gel from a solution in acetone. The dry adsorbate is introduced into a column of 750 grams of neutral silica gel (diameter: 5.75 cm, height: 41 cm) and eluted with a mixture of 2 parts by volume of chloroform and 1 part by volume of acetone. The first liter of eluate is discarded; the subsequent 2 liters contain the reaction product. These 2 liters are evaporated to dryness in vacuo, the residue is dissolved in 40 parts by volume of acetone; 10 parts by volume of methanol are added and the product is converted into the crystalline sodium salt of 7-cyanoacetylamino-3-(2-methylthio-1,3,4-thiadiazol-5-ylthio)methylceph-3-em-4-carboxylic acid by the addition of 1.3 parts by volume of a 3-molar methanolic solution of sodium-α-ethylhexanoate. UV spectrum: $\lambda_{max} = 274$ nm ($\epsilon = 13\ 500$); $[\alpha]_D^{20} = -79° \pm 1°$ ($c = 0.95$ in water). Thin-layer chromatogram on silica gel: $Rf_{52A} = 0.40$; $Rf_{101A} = 0.45$; $Rf_{102A} = 0.78$; Rf in a 9:1 mixture of ethyl acetate and glacial acetic acid = 0.30. MIC: *St.aureus* SG 511=0.04γ/ml; *Bac. subt.*=0.05γ/ml; *Bac.meg.*=10γ/ml; *Bac.cereus*=15γ/ml; *E.coli*=0.5γ/ml.

Example 7

5.27 grams of 2-methyl-1,3,4-oxadiazoline-5-thione are suspended in a solution Of 12.8 grams of the sodium salt of 7-cyanoacetylaminocephalosporanic acid in 280 ml of phosphate buffer (10%) (pH 6.7). The pH is then adjusted to 6.6 by the dropwise addition of 2N sodium carbonate solution while stirring vigorously, and the batch is heated for 7 hours at 60°C in a nitrogen atmosphere. The mixture is cooled and then extracted successively with 2 liters of ethyl acetate and 1.5 liters of ethyl acetate. The organic phases are washed twice with 20 ml of buffer (pH 6.5) each time and discarded. The combined aqueous phases are covered with 2 liters of ethyl acetate and the pH is adjusted to 2.5 by the addition of 4N hydrochloric acid while stirring vigorously. The brown precipitate that forms thereby is removed by filtration. The phases are separated, the aqueous solution is saturated with sodium chloride and extracted once with 1.5 liters of ethyl acetate and then twice with 1 liter of ethyl acetate each time. The organic phases are shaken twice with 100 ml of saturated sodium chloride solution each time, dried with sodium sulphate and concentrated in vacuo to a volume of about 200 ml, a precipitate being formed thereby. 200 milliliters of hexane are added to the slurry while stirring well, and the batch is allowed to stand for 1 hour cold. The batch is then vacuum filtered and the residue is washed with a mixture of ethyl acetate and hexane (1:1). The filtrate is discarded. The residue is adsorbed on to 30 grams of neutral silica gel from a solution in acetone. The dry adsorbate is introduced into a column of 570 grams of neutral silica gel (diameter: 5.75 cm, height: 47 cm) and eluted with a mixture of 2 parts by volume of chloroform and 1 part by volume of acetone. The first 2 liters of eluate are discarded; the subsequent 2 liters contain the reaction product. These 2 liters are evaporated to dryness in vacuo and the residue is taken up in ethyl acetate. In this manner, almost colorless, strongly solvated crystals of the acid form are obtained. These are dissolved in 40 parts by volume of acetone; 10 parts by volume of methanol are added and then conversion into the crystalline sodium salt of 7-cyanoacetylamino-3-(2-1,3,4-oxadiazol-5-ylthio)methylceph-3-em-4-carboxylic acid is effected by the addition of 1.3 parts by volume of a 3-molar methanolic solution of sodium-α-ethylhexanoate while slowly concentrating the solution. UV spectrum: $\lambda_{max} = 268$ nm ($\epsilon = 10\ 500$); $[\alpha]_D^{20} = -57° \pm 1°$ ($c = 0.9$ in water). Thin-layer chromatography on silica gel: $Rf_{52A} = 0.27$; $Rf_{101A} = 0.38$; $Rf_{102A} = 0.65$; Rf in 9:1 mixture of ethyl acetate and glacial acetic acid = 0.18. MIC: *St. Aureus* 2999=2γ/ml; *Bac.subt.*=0.25γ/ml; *Bac.meg*=20γ /ml; *Bac.cereus*=30γ/ml; *E.coli*=2γ/ml; *Kl. pneum.*=2γξ⅗⅔ᵐˡ⁺ *Sam.typh.*=2.5γ/ml.

Example 8

2.7 grams of 1,3,4-thiadiazoline-5-thione are suspended in a solution of 6.4 grams of the sodium salt of 7-cyanoacetylaminocephalosporanic acid in 140 ml of phosphate buffer (10%) (pH 6.7). The pH is then adjusted to 6.5 by the dropwise addition of 2N sodium carbonate solution while stirring vigorously, and the batch is heated for 6 hours at 60°C in a nitrogen atmosphere. The mixture is cooled and then extracted successively with 750 ml of ethyl acetate and 500 ml of ethyl acetate. The organic phases are washed twice with 30 ml of buffer (pH 6.5) each time and discarded. The combined aqueous phases are covered with 1 liter of ethyl acetate and the pH is adjusted to 2.5 by the addition of about 15 ml of 4N hydrochloric acid while stirring vigorously. The brown precipitate that forms thereby is removed by filtration. The phases are separated, the aqueous solution is saturated with sodium chloride and extracted first with 0.5 liter of ethyl acetate and then twice with 250 ml of ethyl acetate each time. The organic phases are shaken twice with 50 ml of saturated sodium chloride solution each time, dried with sodium sulphate and concentrated in vacuo to a volume of about 100 ml. One hundred milliliters of hexane are added to this solution while stirring vigorously, during which a precipitate forms. The batch is allowed to stand for 30 minutes at 0°C, the precipitate is isolated by vacuum filtration and washed first with a 1:1 mixture of ethyl acetate and hexane and then with hexane. 3.66 grams of the precipitate so obtained are adsorbed on to 30 grams of silica gel from a solution in acetone. The dry adsorbate is introduced into a column of 400 grams of silica gel (diameter: 5.75 cm, height: 35 cm) and eluted with a mixture of 2 parts by volume of chloroform and 1 part by volume of acetone. The first 1.7 liters of elulate are discarded; the subsequent 1.5 liters contain the reaction product. They are evaporated to dryness in vacuo, the residue is dissolved in a small amount of ethyl acetate and the solution is concentrated into a solvated, colorless crystalline form. This substance, which is almost pure, is suspended in 20 times the amount of methanol, dissolved by the addition of 1.3 parts by volume of a 3-molar methanolic solution of sodium-α-hexanoate and the solution is concentrated in vacuo to produce the crystalline sodium salt of 7-cyanoacetylamino-3-(1,3,4-thiadiazol-5-ylthio)methylceph-3-em-4-carboxylic acid. UV spectrum: $\lambda_{max} = 270$ nm ($\epsilon = 13150$); $[\alpha]_D^{20} = -14° \pm 1°$ ($c = 1.04$ in water). Thin-layer chromatogram on silica gel: $Rf_{52A} = 0.31$; $Rf_{101A} = 0.47$; $Rf_{102A} = 0.68$; Rf in a 9.1 mixture of ethyl acetate and glacial acetic acid = 0.21.

Example 9

5.8 Grams of 5-mercapto-3-methyl-1,2,4-triazole are suspended in a solution of 12.8 grams of the sodium salt of 7-cyanoacetylaminocephalosporanic acid in 280 ml of phosphate buffer (10%) (pH 6.7). The pH is then adjusted to 6.8 by the dropwise addition of a 2N sodium carbonate solution while stirring vigorously, and the batch is heated for 8 hours at 60°C in a nitrogen atmosphere. The mixture is cooled and then extracted 3 times with 1.5 liters of ethyl acetate each time. The organic phases are washed twice with 50 ml of buffer (6.5pH) each time and discarded. The combined aqueous phases are covered with 2 liters of ethyl acetate and a pH of 2.5 is established with about 45 ml of 4N hydrochloric acid while stirring vigorously. The brown precipitate that forms thereby is removed by filtration. The phases are separated, the aqueous solution is saturated with sodium chloride and extracted with 1.5 liters of ethyl acetate and then with 1 liter of ethyl acetate. The organic phases are shaken twice with 100 ml of saturated sodium chloride solution each time, dried with sodium sulphate and concentrated in vacuo to about 300 ml. 300 milliliters are added to this solution while stirring vigorously, whereupon a precipitate forms. The batch is allowed to stand for 30 minutes at 0°C, the precipitate is isolated by vacuum filtration and washed first with a 1:1 mixture of ethyl acetate and hexane and then with hexane. 5.9 grams of the precipitate so obtained are adsorbed on to 30 grams of silica gel from a solution in acetone. The dry adsorbate is introduced into a column of 470 grams of silica gel (diameter: 5.75 cm, height: 42 cm) and eluted first with a mixture of 2 parts by volume of chloroform and 1 part by volume of acetone (6 liters) and later with a mixture of chloroform part by volume of chloroform and 1 part by volume of acetone (3 liters). The first 6 liters of eluate are discarded; the subsequent 3 liters, which contain the reaction product; are evaporated to dryness in vacuo and the residue is triturated with ethyl acetate. After filtration, the 7-cyanoacetylamino-3-(3-methyl-1,2,4-triazol-5-ylthio)-methylceph-3-em-4-carboxylic acid is obtained in the form of a slightly colored powder. The powder is suspended in methanol, dissolved by the addition of 1.3 parts by volume of a 3N methanolic solution of sodium-α-ethylhexanoate and then converted into the solid sodium salt by the addition of the same volume of absolute ethanol and concentration to a small volume. The slight coloration of the substance can be removed by treatment with active charcoal in methanolic solution. For purification, the sodium salt is converted into the acid by acidifying the aqueous solution to pH 2.5 and extraction with ethyl acetate; the acid is triturated with ethyl acetate as described above and the sodium salt is recovered therefrom in the manner described above. UV spectrum: $\lambda_{max}$-267 nm ($\epsilon = 9900$); $[\alpha]_D^{20} = -11° \pm 1°$ ($c = 1.0$ in water). Thin-layer chromatogram on silica gel: $Rf_{52A} = 0.31$; $Rf_{101A} = 0.45$; $Rf_{102A} = 0.57$; Rf in a 9:1 mixture of ethyl acetate and glacial acetic acid = 0.1.

0.53 gram of 1-methyl-5-mercaptotetrazole are suspended in a solution of 1.34 grams of the sodium salt of 3-propionyloxymethyl-7-cyanoacetylamino-ceph-3-em-4-carboxylic acid in 30 ml of phosphate buffer (10%) (pH 6.7). The pH is adjusted to 6.6 by the dropwise addition of 2N sodium carbonate solution while stirring vigorously and the batch is heated for 7 hours at 60° C in a nitrogen atmosphere. The mixture is cooled and extracted successively with 200 ml of ethyl acetate and 150 ml of ethyl acetate. The organic phases are washed twice with 5 ml of buffer (pH 6.5) each time and discarded. The combined aqueous phases are covered with 300 ml of ethyl acetate and the pH is adjusted to 2.5 with 2N hydrochloric acid (about 6 ml) while stirring vigorously. The brown precipitate that forms is removed by filtration. The phases are separated, the aqueous solution is saturated with sodium chloride and extracted twice with 150 ml of ethyl acetate each time. The organic phases are shaken twice with 10 ml of saturated sodium chloride solution each time, dried with sodium sulphate and concentrated to a volume of about 20 ml in vacuo. 20 milliliters of hexane are added to this solution in small portions while stirring well and the batch is allowed to stand for several hours cold. It is then vacuum filtered and the residue is washed with a 1:1 mixture of ethyl acetate and hexane. The filtrate is discarded. The residue is adsorbed on to 5 grams of neutral silica gel from a solution in acetone. The dry adsorbate is introduced into a column of 50 grams of neutral silica gel and eluted with a mixture of 2 parts by volume of chloroform and 1 part by volume of acetone. The first 160 ml of eluate are discarded; the subsequent 200 ml contain the reaction product. The are evaporated to dryness in vacuo, the residue is dissolved in 30 parts by volume of acetone; 5 parts by volume of methanol are added and then conversion into the crystalline sodium salt of 7-cyanoacetylamino-3-(1-methyltetrazolyl-5-ylthio)methylceph-3-em-4-carboxylic acid is effected by the addition of 1.3 parts by volume of a 3-molar methanolic solution of sodium-α-ethylhexanoate. UV spectrum: $\lambda_{max} = 268$ mm ($\epsilon = 11150$); $[\alpha]_D^{20} = +22° \pm 1°$ ($c = 0.99$ in water). Thin-layer chromatogram on silica gel: $Rf_{52A} = 0.28$; $Rf_{101A} = 0.54$; $Rf_{102A} = 0.76$; Rf in a 9:1 mixture of ethyl acetate and glacial acetic acid = 0.19. MIC: St.aureus 2999=1γ/ml; Bac.meg.=25γ=25γ/ml; E.coli=0.5 γ/ml; Kl.pneum.=0.4γ/ml; Salm.typh.=0.5γ/ml.

The starting material can be prepared as follows:

A suspension of 20.0 g (36.7 mmols) of N,N-phthaloyl-cephalosporin C (of 72 percent purity) in 400 ml of distilled water is turned into a solution with 71 ml of N-sodium hydroxide solution. The solution is stirred for 20 hours with 400 mg of the acetyl esterase of Bacillus subtilis ATCC 6633 at 37°C while keeping the H value constant at 7.3. The acetic acid liberated by the enzymatic hydrolysis is neutralized with 32 ml of N-sodium hydroxide solution. On completion of the hydrolysis reaction ethyl acetate and, while cooling at 0°C and stirring, 20 percent phosphoric acid are added until a pH value of 2.3 has been reached. The aqueous phase is saturated with sodium chloride and further extracted with 3 × 300 ml of ethyl acetate. The extracts are washed with saturated sodium chloride solution, dried with sodium sulphate and evaporated. The desacetylated crude product of N,N-phthaloyl-cephalosporin C is taken up in 320 ml of dioxan and 80 ml of methanol, then 18 g of diphenyldiazomethane are added portionwise and the whole is stirred for 3 hours at room temperature. The solution is then evaporated to dryness and the residue digested with 2 × 400 ml of ether. The residue is dissolved in benzene and chromatographed on 200 g of silica gel washed with acid (diameter of column 4.15 cm). Fractions of 100 ml each are withdrawn. Three fractions each obtained with benzene, benzene+ethyl acetate 9 : 1 and benzene+ethyl acetate 5 : 5, are discarded. The next four benzene+ethyl acetate 5 : 5 fractions elute 7-[5'-phthalimido-5'carboxybenzhydryl-valeroyl]-amino-ceph-3-em-3-hydroxymethyl-4-carboxylic acid benzhydryl ester and this product is crystallized from ethyl acetate+cyclohexane. It melts at 113°–115°C. $[\alpha]_D^{20} = +5° + 1°$ ($c = 1.131$ in chloroform). Ultraviolet absorption spectrum in rectified alcohol: $\lambda_{max}$ 259 m$\mu$ ($\epsilon = 9,100$) and $\lambda_{infl.}$ 241 m$\mu$ ($\epsilon = 14,600$).

In the thin-layer chromatogram on silicagel in the system toluene+acetone 4 : 1 the substance reveals an Rf value of 0.11 (development with iodine).

While cooling with carbon dioxide snow, a solution of 3.34 g (4 mmols) of 7-[5'-phthalimido-5'-carboxybenzhydryl-valeroyl]-amino-ceph-3-em-3-hydroxymethyl-4-carboxylic acid benzhydryl ester in 7 ml of dimethylformaide is dropped into a mixture of 3.46 ml (40 mmols) of propionylchloride and 2.90 ml (36 mmols) of pyridine in 30 ml of absolute dimethylformamide. The batch is allowed to react for 3 hours at room temperature. The reaction product is distributed between 800 ml of monobasic potassium phosphate solution of 10 percent strength and 1 liter of ethyl acetate and each is once more extracted with one-half liter of ethyl acetate. The combined ethyl acetate extracts are washed with saturated sodium chloride solution, dried with sodium sulphate and evaporated, to yield 7-[5'-phthalimido-5'-carboxybenzhydryl-valeroyl]-amino-ceph-3-em-3-propionyloxymethyl-4-carboxylic acid benzhydryl ester which crystallizes in the form of colorless clusters from acetone+ethyl acetate and melts at 163°–165°C. $[\alpha]_D^{20} = +16°$ ($c = 1.119$ in chloroform). Ultraviolet absorption spectrum in rectified alcohol:
$\lambda_{max}$ 260m$\mu$ ($\epsilon = 9100$), $\lambda_{infl.}$ 241 m$\mu$ ($\epsilon = 14,300$). In the thin-layer chromatogram on silicagel in the system tolueneacetone 9 : 1 the substance reveals an Rf value of 0.19.

A solution of 2.03 g (2.28 mmols) of 7-[5'-phthalimido-5'-carboybenzhydryl-valeroyl]-amino-ceph-3-em-3-propionyloxymethyl-4-carboxylic acid benzhydryl ester in 20 ml of methylenechloride is cooled to −10°C, and 1.75 ml (21.7 mmols) of absolute pyridine are added. Then, within 12 minutes, 11.4 ml (5.5 mmols) of a freshly prepared 10 percent phosphorus pentachloride solution in absolute methylenechloride are stirred in. The batch is stirred for 40 minutes at −10°C. In the course of 3 minutes, 7.62 ml (188 mmols) of absolute methanol cooled at −20°C are added. The reaction mixture is stirred on for 30 minutes at −10°C and for 60 minutes at +20°C and while being thoroughly stirred mixed with 19 ml (19 mmols) of N-hydrochloric acid and the whole is allowed to react further for 45 minutes at 20°C. The mixture is then adjusted to pH = 8.0 with 3.8 ml of 50 percent aqueous tribasic potassium phosphate and 18.3 ml of 2N-sodium hydroxide solution. The phases are separated, the methylenechloride extract is dried over sodium sulphate and evaporated and the residue dried for 2 hours in a high vacuum. The residue is taken up in 50 ml of toluene+ethyl acetate 3 : 1 and extracted with 3 × 20 ml of ethanol and 2N-hydrochloric acid 1: 1. The combined bottom phases are adjusted to pH = 7.0 with 30 ml of 2N-sodium carbonate solution, the alcohol is expelled and the aqueous solution is once more extracted with ethyl acetate. The ethyl acetate extract is dried and evaporated and then immediately taken up in 1.14 ml (10.5 mmols) of anisole, cooled to −30°C, and 3.32 ml (43.5 mmols) of trifluoroacetic acid are added. The acid is allowed to act for 30 minutes at +20°C and then thoroughly evaporated with addition of toluene. The residue is mixed with 40 ml of methanol cooled at −30°C and adjusted to pH= 3.5 with 0.4 ml of triethylamine. The spontaneously formed precipitate is removed on a centrifuge and washed twice with 5 ml each of methanol, methylenechloride and ether and dried in a high vacuum. 3-Propionyloxymethyl-7-amino-ceph-3-em-4-carboxylic acid is an amorphous powder. $[\alpha]_D^{20} = +110° \pm 1°$ ($c = 1.000$ in 0.5N-sodium bicarbonate solution). Ultraviolet absorption spectrum in 0.5N-sodium bicarbonate solution: $\lambda_{max}$ 262 m$\mu$ ($\epsilon = 8,200$).

In the thin-layer chromatogram on silicagel in the system n-butanol + pyridine + glacial acetic acid + water (30:20:6:24) the substance reveals an Rf value of 0.58 (7-aminocephalosporanic acid: Rf = 0.55).

A solution of 374 mg of cyanoacetic acid in 2.5 ml of tetrahydrofuran contained in a 25 ml sulphuretting flask equipped with magnetic stirrer is mixed under nitrogen at −50° to −70°C with 0.596 ml of triethylamine and 0.476 ml of trichloroacethylchloride, and the batch is allowed to react while being stirred for 15 minutes at −50° to −70°C. Then a solution, cooled at −70°C., of 573 mg (2 mmols) of 7-amino-3-em-3-propionyloxymethyl-4-carboxylic acid and 1 ml of triethylamine in 6.5 ml of methylenechloride is added and the mixture is stirred for 45 minutes under nitrogen at −50 to −70°C, then stirred with 10 ml of 10 percent aqueous monobasic potassium phosphate solution, whereupon the pH value adjusts itself at 5.0. The bottom, organic phase is separated and the aqueous phase extracted with 5 ml of methylenechloride and further with 10 ml of ethyl acetate. The aqueous phase is covered with 20 ml of ethyl acetate, acidified to pH = 2.0 with 2N-hydrochloric acid and—after saturation with sodium chloride and phase separation—further extracted with 2 × 10 ml of ethyl acetate. The three ethyl acetate extracts are washed with 10 ml of saturated sodium chloride solution, dried with sodium sulphate and filtered through a column (diameter 16 mm, height 10 cm) of 5 g of silicagel. The column is rinsed with 20 ml of ethyl acetate and the combined filtrates are concentrated to 2.3 to 3.0 g. From the concentrated solution 3-propionyloxymethyl-7-cyanoacetylamino-ceph-3-em-4-carboxylic acid is precipitated with 50 ml of ether+petroleum ether 1 : 1, and then recrystallized from tetrahydrofuran+ethyl acetate. It melts at 146°–150°C.

The Rf value of the substance is 0.35 (7-cyanoacetylaminocephalosporanic acid: Rf = 0.26) in the thin layer chromatogram on silicagel in the system n-butanol + glacial acetic acid + water (67 : 10 : 23).

Example 11

3.23 grams of 1-methyl-5-mercaptotetrazole are suspended in a solution of 8.84 grams of the sodium salt of 7-($\alpha$-phenyl-$\alpha$-cyanoacetylamino)-cephalosporanic acid in 190 ml of phosphate buffer (10%)(pH 6.7). The pH is adjusted to 6.5 by the addition of 80 ml of a 10 percent solution of $K_2HPO_4$ while stirring vigorously, and the batch is heated for 7 hours at 60°C in a nitrogen atmosphere. The mixture is cooled and extracted successively with 1 liter of ethyl acetate and 0.5 liter of ethyl acetate. The organic phases are washed twice with 20 ml of buffer (pH 6.5) each time and discarded. The combined aqueous phases are covered with 1.5 liters of ethyl acetate and a pH of 2.6 is established with about 37 ml of 4N hydrochloric acid while stirring vigorously. The brown precipitate that forms thereby is removed by filtration. The phases are separated, the aqueous solution is saturated with sodium chloride, extracted once with 1 liter of ethyl acetate and then with 0.5 liter of ethyl acetate. The organic phases are shaken twice with 70 ml of saturated sodium chloride solution each time, dried with sodium sulphate and then concentrated in vacuo to a volume of about 100 ml. One hundred milliliters of hexane are added to this solution in small portions while stirring well and the batch is allowed to stand for several hours cold. It is then vacuum filtered and the residue is washed with a 1:1 mixture of ethyl acetate and hexane. The filtrate is discarded. The residue (8.5 grams) is adsorbed on to 50 grams of neutral silica gel from a solution in acetone. The dry adsorbate is introduced into a column of 450 grams of neutral silica gel (diameter 5.75 cm, height 41 cm) and eluted with a mixture of 2 parts by volume of chloroform and 1 part by volume of acetone. The first 1 liter of eluate is discarded; the following fractions contain the reaction product. These fractions are evaporated to dryness in vacuo, the residue is dissolved in 40 parts by volume of acetone, 10 parts by volume of methanol are added and then the product is converted into the crystalline sodium salt of 7-($\alpha$-phenyl-$\alpha$-cyanoacetylamino)-3-(1-methyl-tetrazol-5-ylthio)methylceph-3-em-4-carboxylic acid by the addition of 1.3 parts by volume of a 3-molar methanolic solution of sodium-$\alpha$-ethyl-hexanoate. In a thin layer chromatogram on silica gel $Rf_{52A} = 0.44$, Rf in ethyl acetate/glacial acetic acid (9:1), running distance 16 cms = 0.53.

Example 12

86 mg of 2-methyl-1,3,4-thiadiazoline-5-thione is suspended in a solution of 207 mg of sodium salt of 7-($\alpha$-phenyl-$\alpha$-cyanoacetalamino)-cephalosporanic acid in 4.5 ml of phosphate buffer (10%) having a pH of 6.7. The pH is then adjusted to 6.5 by the addition of 2.7 ml of a 10 percent solution of $K_2HPO_4$ while stirring vigorously and the batch is heated for 7 hours at 60°C in a nitrogen atmosphere. The batch is cooled and extracted twice with 40 ml of ethyl acetate each time. The organic phases are washed twice with 3 ml of buffer (pH 6.5) each time and discarded. The combined aqueous phases are covered with 50 ml of ethyl acetate and the pH is adjusted to 2.6 with 4N hydrochloric acid while stirring vigorously. The brown precipitate that forms thereby is removed by filtration. The phases are separated, the aqueous solution is saturated with sodium chloride and extracted with 30 ml of ethyl acetate and then with 20 ml of ethyl acetate. The organic phases are shaken twice with 5 ml of saturated sodium chloride solution each time, then dried with sodium sulphate, and evaporated to dryness in vacuo. The residue is dissolved in a chloroform/acetone mixture (1:1) and filtered through a column of 20 grams of silica gel (diameter:height = 1:9) and then evaporated to dryness in vacuo. The residue is dissolved in a little acetone and then converted into the sodium salt of 7-($\alpha$-phenyl-$\alpha$-cyanoacetylamino)-3-(2-methyl-1,3,4-thiadiazol-5-ylthio)methylceph-3-em-4-carboxylic acid.

Thin-layer chromatogram on silica gel: $Rf_{52}A = 0.57$, Rf in ethyl acetate/glacial acetic acid (9:1), running distance 15 cms = 0.51. For comparison: for 7-bromoacetylcephalosporanic acid is $Rf_{52A} = 0.51$, Rf is ethyl acetate/glacial acetic acid (9:1); running distance 15 cms = 0.69.

We claim:

1. A compound of formula I

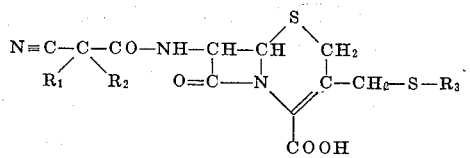

in which $R_1$ and $R_2$ each represent a member selected from the group consisting of hydrogen, lower alkyl, lower alkyl substituted by a member selected from the group consisting of halogen, trifluoromethyl, nitro and amino, phenyl, naphthyl, phenyl-lower alkyl, naphthyl-lower alkyl and each of said substituents in which the carbocyclic portion is substituted by a member selected from the group consisting of halogen, trifluoromethyl, nitro, amino and lower alkyl, monocyclic heterocyclic aryl, and monocyclic heterocyclic aryl substituted by a member selected from the group consisting of halogen, trifluoromethyl, nitro, amino and lower alkyl, each of said heterocyclic aryl groups having one to three ring hetero atoms selected from the group consisting of nitrogen, sulfur and oxygen and $R_1$ and $R_2$ taken together represent

, in which R'₁ and R'₂ have the same meanings as R₁ and R₂ respectively, or, taken together represent a member selected from the group consisting of lower alkylene or lower alkenylene, R₃ represents (1) a heterocyclyl radical of aromatic character having five ring atoms which is bound to the sulphur atom by way of a carbon atom and which contains at least two nitrogen atoms and a further hetero atom selected from the group consisting of nitrogen, oxygen and sulphur or (2) said heterocyclic radical substituted by a member selected from the group consisting of lower alkyl, lower alkylthio, cycloalkyl having five to six carbon atoms, phenyl, phenyl substituted by one or more nitro groups or halogen atoms or lower alkyl or lower alkoxy groups, and thienyl, or a therapeutically acceptable salt of these compounds.

2. A compound of formula I as claimed in claim 1, in which R₁ and R₂ each represent a hydrogen atom and R₃ has the meaning as indicated in claim 1, or a therapeutically acceptable salt thereof.

3. A compound of formula I as claimed in claim 1, in which R₁ represents a hydrogen atom and R₂ has the meaning as indicated in claim 15, other than hydrogen, and R₃ has the meaning as indicated in claim 15, or a therapeutically acceptable salt thereof.

4. A compound of formula I as claimed in claim 1, in which R₁ represents a hydrogen atom and R₂ is phenyl or phenyl substituted by one or more members selected from the group consisting of halogen atoms, lower alkyl, lower alkoxy groups and the nitro group, and R₃ has the meaning as indicated in claim 15, or a therapeutically acceptable salt thereof.

5. A compound of formula I as claimed in claim 1, in which R₁ and R₂ together represent a radical of the formula

in which R'₁ and R'₂ each denote a lower alkyl radical or together represent an alkylene radical having up to six carbon atoms, and in which R₃ has the meaning as indicated in claim 1, or a therapeutically acceptable salt thereof.

6. A compound of formula I as claimed in claim 1, in which R₁ and R₂ have the meaning as indicated in claim 1 in which R₃ is an unsubstituted heterocyclyl radical selected from the group consisting of triazolyl, tetrazolyl, thiadiazolyl and oxadiazolyl.

7. A compound of formula I as claimed in claim 1, in which R₁ and R₂ have the meaning as indicated in claim 1 and in which R₃ is an unsubstituted 1,3,4-thiadiazolyl(5)- or 1,2,4-thiadiazolyl(5)-radical, or a therapeutically acceptable salt thereof.

8. A compound of formula I as claimed in claim 1, in which R₁ and R₂ have the meaning as indicated in claim 1 and in which R₃ is an unsubstituted tetrazolyl(5)-radical, or a therapeutically acceptable salt thereof.

9. A compound of formula I as claimed in claim 1, in which R₁ and R₂ represent hydrogen and in which R₃ is a member selected from the group consisting of 1,3,4-thiadiazol-5-yl, 2-methyl-1,3,4-thiadiazol-5-yl, 3-methyl-1,2,4-triazol-5-yl, 2-methylthio-1,3,4-thiadiazol-5-yl and 1-methyl-tetrazol-5-yl, or a therapeutically acceptable salt thereof.

10. A compound as claimed in claim 1 and being 7-cyanacetylamino-3-desacetoxy-3-(2-methyl-1,3,4-thiadiazol-5-ylthio)-cephalosporanic acid, or a therapeutically acceptable salt thereof.

11. A compound as claimed in claim 1 and being 7-cyanacetylamino-3-desacetoxy-3-(3-methyl-1,2,4-thiadiazol-5-ylthio)-cephalosporanic acid, or a therapeutically acceptable salt thereof.

12. A compound as claimed in claim 1 and being 7-cyanacetylamino-3-desacetoxy-3-(1-methyl-tetrazol-5-ylthio)-cephalosporanic acid, or a therapeutically acceptable salt thereof.

13. A compound as claimed in claim 1 and being 7-cyanacetylamino-3-desacetoxy-3-(2-methylthio-1,3,4-thiadiazol-5-ylthio)-cephalosporanic acid, or a therapeutically acceptable salt thereof.

* * * * *